United States Patent

[11] 3,593,602

| [72] | Inventor | Stanley John Westrom |
| | | 918 Douglas, Des Moines, Iowa 50313 |
| [21] | Appl. No. | 809,772 |
| [22] | Filed | Mar. 24, 1969 |
| [45] | Patented | July 20, 1971 |

[54] TAPER ATTACHEMENT FOR A TURNING LATHE
1 Claim, 9 Drawing Figs.

[52] U.S. Cl. ..................................................... 82/15, 82/33 A
[51] Int. Cl. ..................................................... B23b 5/38, B23b 23/02
[50] Field of Search ........................................... 82/15, 33.1

[56] References Cited

UNITED STATES PATENTS

| 2,372,916 | 4/1945 | Truba et al. | 82/15 |
| 3,156,145 | 11/1964 | Schultz | 82/15 |

FOREIGN PATENTS

| 183,367 | 7/1922 | Great Britain | 82/15 |

OTHER REFERENCES

Publication: POPULAR SCIENCE, article entitled " Don' t Set Over That Tailstock," pages 174 and 175, February 1947.

Primary Examiner—Francis S. Husar
Attorney—Rudolph L. Lowell

ABSTRACT: The taper attachment provides a center on the tailstock of a turning lathe that enables the operator to quickly set up the lathe for cutting tapers over the full length of the lathe bed without requiring any movement or setting of the tailstock. The attachment includes a baseplate that has a sideplate provided with a tapering center. The baseplate is mounted on the tailstock quill with the slide plate horizontally movable transversely of the lathe to move the tapering center from a coaxially aligned position with the quill axis to an adjusted position providing for a desired taper cut.

3,593,602
PATENTED JUL 20 1971
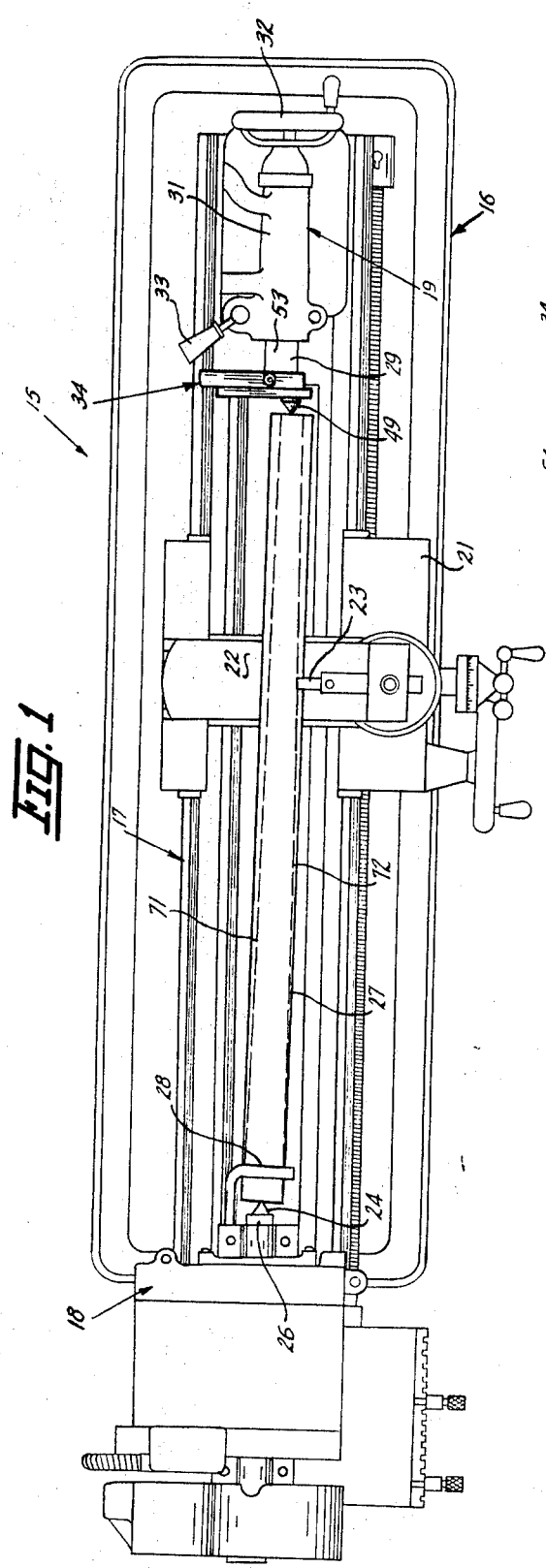
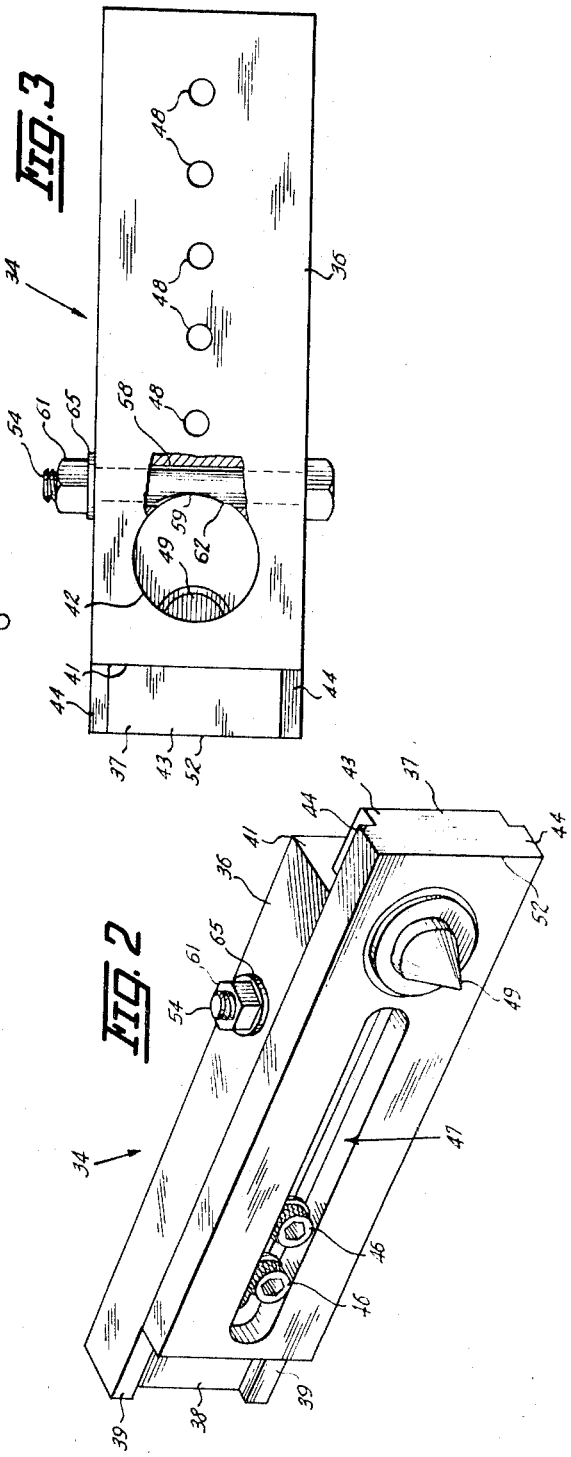
INVENTOR.
STANLEY JOHN WESTROM
BY Rudolph L. Lowell
ATTORNEY

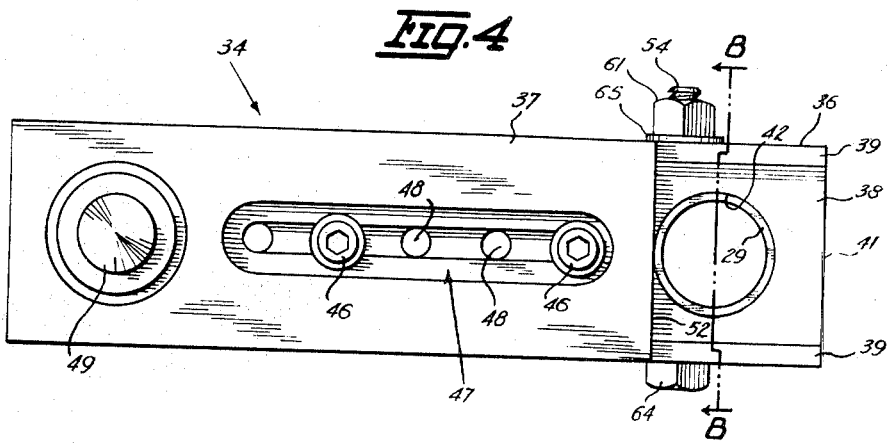
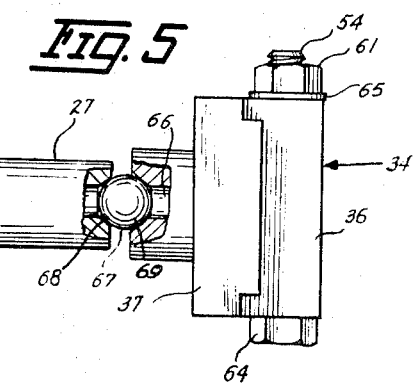
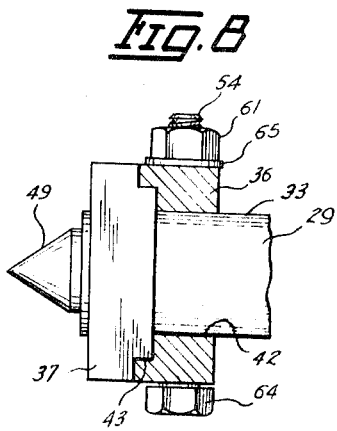
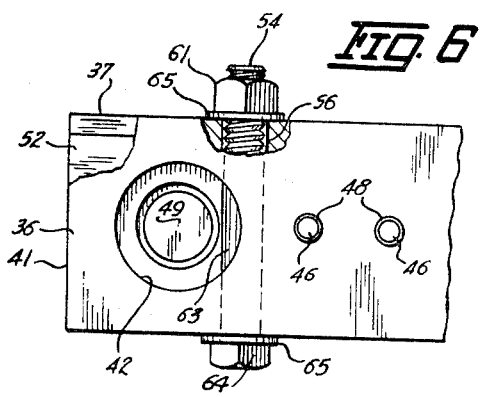
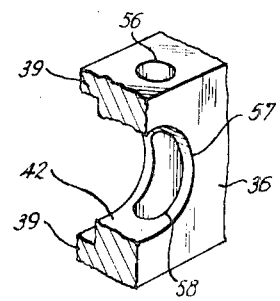
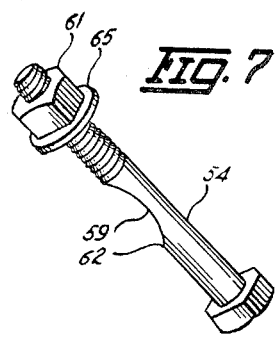
INVENTOR
STANLEY JOHN WESTROM

TAPER ATTACHEMENT FOR A TURNING LATHE

SUMMARY OF THE INVENTION

The taper attachment is of a compact and simple construction and is readily clamped on the tailstock quill with a minimum of time and effort. The center on the taper attachment is movable from a position in coaxial alignment with the axis of the quill to a horizontally moved adjusted position transversely of the lathe to a desired tapering location. The taper adjustment can be made over a 3-inch range to each side of the quill axis for taper cuts over the full length of the lathe bed. The base or mounting plate of the attachment and the slidable plate thereon which carries the taper center have a pair of corresponding square end surfaces which are in a common plane when the taper center is coaxial with the quill axis. The taper adjustment or setover is thus quickly and accurately determined by the use of a depth micrometer. All taper adjustments are made independent of any movement of the lathe tailstock so that the normal center of the tailstock is retained and ready for use on removal of the taper attachment from the quill.

BRIEF DESCRIPTION OF THE DRAWINGS

FIG. 1 is plan view of a turning lathe showing the taper attachment of this invention in assembly relation with the tailstock thereof;

FIG. 2 is a front perspective view of the taper attachment;

FIG. 3 is a rear elevation view of the taper attachment;

FIG. 4 is a front elevation view of the attachment showing parts thereof in changed positions relative to their positions shown in FIGS. 2 and 3;

FIG. 5 is a detail view showing the attachment equipped with a female center;

FIG. 6 is a foreshortened rear elevation view with parts broken away showing the attachment clamping bolt assembled relative to the quill receiving bore prior to a machining of the bolt in conformance with the sidewall of the bore;

FIG. 7 is a perspective view of the clamping bolt after it has been machined;

FIG. 8 is a sectional view as seen along the line 8—8 of FIG. 4; and

FIG. 9 is a fragmentary perspective detail view of the quill receiving bore.

DETAILED DESCRIPTION OF THE PREFERRED EMBODIMENT

Referring to the drawings there is illustrated in FIG. 1 a turning lathe 15 of a conventional type having a frame 16, a bed 17, a headstock 18 and a tailstock 19. A saddle 21 carries a cross slide 22 for supporting a cutting tool 23. The headstock has a center 24 and a power driven head member 26 to which a workpiece 27 is operatively connected by the usual dog 28. The tailstock 19 includes a quill or hollow spindle 29 that is axially adjustable relative to the tailstock body member 31 by an adjusting wheel 32 and locked in an adjusted position by a clamping handle 33. The quill 29, in a usual turning operation, is provided with a tang or tapered arbor (not shown) that is usually formed with a dead center arranged in axial alignment with the headstock center 24. In the use of the taper attachment 34 of this invention the tang is removed from the quill 29 to provide for the mounting of the attachment directly on the quill while leaving the tailstock 19 in center with the headstock center 24.

As shown in FIGS. 2 and 3, the attachment 34 includes a base or mounting plate 36 and a slide plate 37. The baseplate 36 is of a rectangular shape and is formed on one side with a longitudinal guideway 38 having a pair of transversely spaced upright side guide members 39. Adjacent one end 41 of the baseplate 36 is a laterally extended quill receiving opening or bore 42. The slide plate 37 is also of a rectangular shape corresponding in size to the baseplate 36 and is formed on one side with a longitudinally extended key member 43 and guide shoulders 44 for mating guidable engagement with the guideway 38 and guide members 39, respectively.

It is seen therefore that the slide plate 37 is supported on the baseplate 36 for movement longitudinally thereof to adjusted positions. The slide plate 37 is locked in an adjusted position by locking screws 46 which extend through a longitudinal slot 47 in the slide plate 37 for threaded engagement within selected threaded openings 48 that are arranged in a spaced relation longitudinally of the baseplate 36.

A center 49 is located adjacent one end of the slide plate 37 at a position such that when the corresponding ends 41 and 52 of the plates 36 and 37, respectively, have the end surfaces thereof in a common plane (FIG. 6), the center 49 is coaxial with the axis of the bore 42 in the baseplate 36. The center 49 and the axis of the bore 42 at any moved position of the slide 37, are thus always in a common plane extended longitudinally of the baseplate 36 and slide plate 37.

The attachment 34 is assembled with the tailstock 19 by mounting the baseplate 36 on the quill 29. Thus the projected end 53 of the quill 29 (FIGS. 1 and 8) is inserted within the baseplate bore 42, the diameter of which is only slightly greater than the outer diameter of the quill. With the plates 36 and 37 thus positioned upright and extended transversely of the lathe 15 the attachment 34 is horizontally positioned by the use of a usual level gauge (not shown) placed on the upper side of the slide plate 37. The baseplate 36 is then rigidly secured in a mounted position on the quill 29 by the tightening of a single clamping bolt 54 on the baseplate 36.

With the attachment 34 thus assembled on the quill the center 49 on the slide plate 37 is movable transversely of the lathe 15 in a horizontal plane common to the axis of the quill 29 to a selected taper position. As previously mentioned, the angle or the amount of taper is determined directly by using a depth micrometer to measure the distance between the end surfaces 41 and 52 of the baseplate 36 and slide plate 37, respectively. When the taper is determined, the slide plate 37 is rigidly locked to the baseplate 36 by the locking screws 46.

The baseplate 36 is formed with a transverse bore 56 having its axis substantially tangent to the quill receiving bore 42 so as to intersect a portion of the bore sidewall 57, (FIGS. 6 and 9). As a result of this intersection the sidewall 57 is formed with a circumferential opening 58. The clamping bolt 54 (FIGS. 3 and 7) is extended through the bore 56 and is formed intermediate its ends with a longitudinally extended concave surface 59 of a curvature corresponding to the curvature of the sidewall 57 and of a size to complete the sidewall at the opening 58 therein. The bolt is axially movable to provide for a movement of the arcuate surface 59 into and out of a conforming relation with the peripheral surface of the sidewall 57.

When the arcuate surface 59 is in a conforming relation the opening or bore 42 in the baseplate is free to receive the projected end 53 of the quill 29. On tightening of the nut 61 for the bolt 54 the end 62 of the arcuate section 59 is moved into bearing engagement with an adjacent outer peripheral portion of the quill 29 whereby the baseplate 36 is positively clamped on the quill against any movement relative thereto.

In the forming of the concave surface 59 the bolt 54 is initially extended through the transverse bore 56 of the baseplate (FIG. 6) so that a side portion 63 thereof projects through the sidewall opening 58 and into the quill receiving bore 42. With the bolt head 64 and clamping nut 61 spaced from the baseplate 36 by washers 65, the nut 61 is tightened to rigidly hold the bolt 54 against movement relative to the baseplate 36. The bolt portion 63 within the quill bore 42 is then removed by a boring operation to form the concave surface 59 (FIG. 7). On removal of the washers 65 the bolt 54 is axially movable to provide for the movement of the bolt surface 59 into and out of a conforming relation with the peripheral surface of the sidewall 57.

In one embodiment of the invention the center 49 on the slide plate 37 is linearly movable a distance of about 3 inches to each side of the axis of the quill member 29. Over the outer range of this movement the center 49 may be removed and replaced with a female center 66 shown in FIG. 5 to reduce wear on the center 49 along with more accurately maintaining the desired taper on the workpiece 27. The female center 66 is of a conventional type wherein a ball bearing 67 is supported in a seated relation within countersunk centers 68 and 69 formed in the workpiece 27 and female center 66, respectively, so as to function as a rotational universal joint.

In those instances where the taper on a machined item is to be duplicated such is readily accomplished by initially positioning the machined item as indicated in dotted lines at 71 in FIG. 1, and then adjusting the slide plate member 37 to locate the side portions 72 of the machined item 71 in a parallel relation with the lathe bed 17. When this parallel relation is attained the slide plate 37 is locked to the baseplate 36 by the locking screws 46. On removal of the machined item 71 and its replacement by a workpiece 27 which is to have the duplicate taper, the setting up operation for such purpose is completed. It will be noted that in some instances the taper attachment 34 may be retained on the tailstock 19 for use in straight turning operations. This setting is easily accomplished by merely aligning the end surfaces 41 and 52 in a common plane wherein the center 49 is in coaxial alignment with the quill 29.

I claim:

1. A taper attachment for a lathe or the like including a tailstock having a center supporting spindle projected therefrom comprising:

a. an elongated flat baseplate having a laterally extended opening to snugly receive the projected end of the spindle therein,
   b. means on said baseplate for rigidly clamping the baseplate on said spindle in a position horizontally disposed transversely of the lathe,
   c. a slide plate having means for slidably mounting said slide plate on said baseplate for movement longitudinally of the baseplate in a plane normal to the axis of said opening,
   d. a center on and adjacent one end of said slide plate having the axis thereof coaxial with the axis of said opening in one moved position of said slide plate, and
   e. coacting means on said two plates for locking the slide plate in a moved position,
   f. said mounting means and coacting means being relatively constructed so that said slide plate is reversibly engageable end for end with said baseplate to provide for a selected position of the center outwardly from either end of said baseplate,
   g. said slide plate and baseplate have a pair of corresponding flat end surfaces lying in a common plane when the slide plate is in said one moved position therefor, whereby the distance the slide plate is moved from said one moved position to a second moved position is indicated directly by the distance between the planes of said pair of flat surfaces.